N. Waterman,

Waiter.

No. 3432. Reissued May 11. 1869.

Witnesses.

S. N. Piper.

J. R. Snow

N. Waterman.

by his attorney.

R. Ready

N. PETERS, PHOTO-LITHOGRAPHER, WASHINGTON, D. C.

UNITED STATES PATENT OFFICE.

PATRICK A. DOHERTY, OF BOSTON, MASSACHUSETTS, ASSIGNEE OF JANE G. WATERMAN, WIDOW, AND JAMES D. MARTIN, ADMINISTRATOR OF THE ESTATE OF NATHANIEL WATERMAN, DECEASED.

IMPROVED TABLE TRAY OR WAITER.

Specification forming part of Letters Patent No. 38,519, dated May 12, 1863; reissue No. 3,432, dated May 11, 1869.

*To all whom it may concern:*

Whereas Letters Patent No. 38,519 of the United States of America were granted on the 12th day of May, A. D. 1863, to NATHANIEL WATERMAN, of Boston, in the county of Suffolk and State of Massachusetts, for an invention of an Improved Table Waiter or Tray; and whereas the said patentee has since deceased, and all the exclusive property granted to him by such patent has been duly assigned and transferred to the undersigned, PATRICK A. DOHERTY, of the said city, by James D. Martin, administrator of the estate of the said NATHANIEL WATERMAN, and by Jane G. Waterman, widow of the said NATHANIEL, as will appear by certain deeds of assignment on record in the books of the United States Patent Office; and whereas, by reason of an insufficient specification, the said patent is believed by the undersigned not to be fully valid or available to him, and he has applied for leave to surrender the said patent and to have a new patent issued on an amended specification; now, therefore, I, the said PATRICK A. DOHERTY, do hereby declare the said invention to be fully described in the following specification, and represented in the accompanying drawings, of which—

Figure 1:
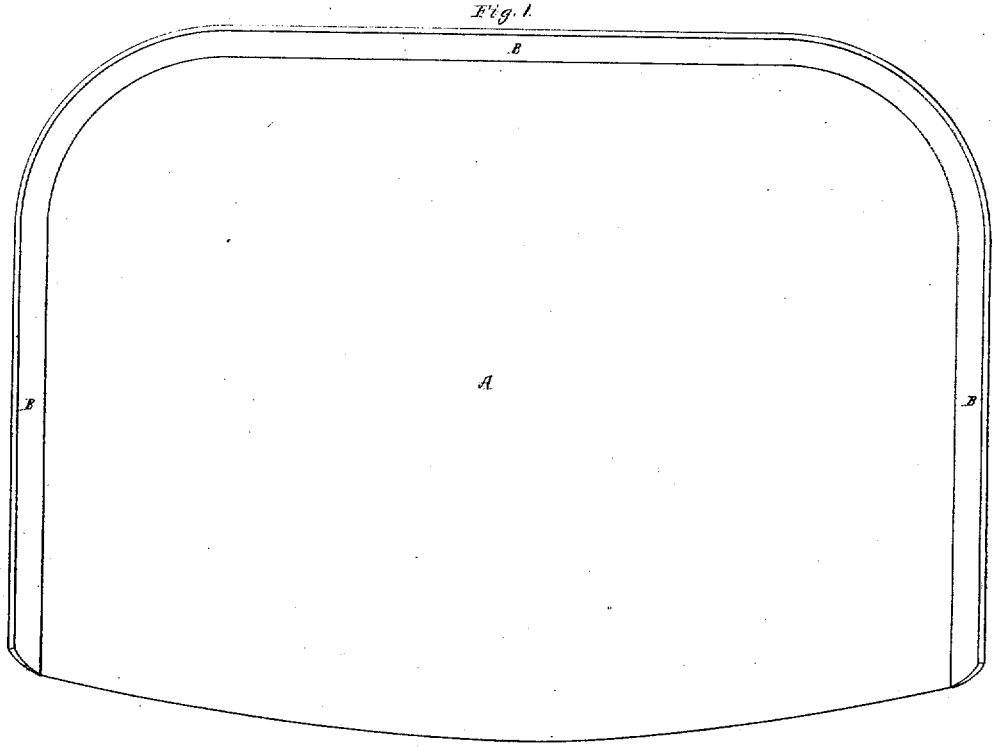
Figure 2:
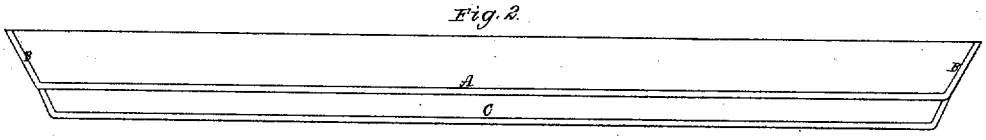
Figure 3:
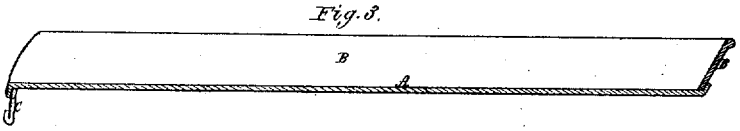

Fig. 1 is a top view, Fig. 2 a side view, and Fig. 3 a transverse section, of a waiter or tray embodying such invention.

The nature of the invention may be stated to consist as follows: First, in producing a waiter or tray with a lip, or its equivalent, to project down from one edge and below the bottom of the tray, such lip when the waiter is placed on a table being to rest against one edge of it, so as to prevent the waiter from being accidentally pushed forward on the table by a person while pressing against that edge of the waiter which is next adjacent to the lip. Second, in the waiter or tray as formed, without any rim to project upward from the rear edge of its bottom, the rim being extended from the other edges of the bottom.

The part of the bottom on which there is no rim, may be either curved or straight, but, as a general thing, it is preferred to curve it, in order that it may better fit to a round-table top, and the lip better abut against the edge thereof, when the tray may be in use, than would be the case were the said part to be straight. Fig. 1 of the drawings shows the part as curved.

In the said drawings, A denotes the bottom, and B the rim, of the tray, such rim being shown as elevated around the tray, except at its rear edge or part. From the part so unprovided with a rim, a flange or lip, C, extends downward and below the bottom, in manner as shown in Figs. 2 and 3.

A waiter or tray, when made without the rim at its rear, and placed on a table and in front of a person who may be sitting thereat, will have no part of the rim directly underneath the arms of the person, so as to interfere with or discommode them, the elbows or fore-arms being able to rest directly on the bottom of the tray.

Furthermore, the tray, as made with the projection or lip extending down from it, is not only advantageous, as set forth, but is very useful for a child, as, when placed before him and on a table at which he may be sitting, it will prevent him from soiling that part of the table-cloth on which the tray may rest.

What is claimed as the invention of the said WATERMAN, by the undersigned, is as follows, viz:

1. A table waiter or tray, as made or provided with the lip C, or its equivalent, applied to and projecting down from its rear part, such lip being for the purpose specified.

2. A table waiter or tray, as made with the rim extended partially around it and above its bottom, in manner substantially as specified.

3. A table waiter or tray, as having not only a rim extended partially around and above its bottom, as set forth, but with a lip, or its equivalent, extended down from its rear edge, the whole being substantially as explained.

PATRICK A. DOHERTY.

Witnesses:
R. H. EDDY,
J. R. SNOW.